US007600680B2

(12) United States Patent
Roth

(10) Patent No.: US 7,600,680 B2
(45) Date of Patent: Oct. 13, 2009

(54) TIME DELIMITED MULTIPLE ADMISSION METHOD AND SYSTEM

(75) Inventor: Anthony G Roth, Laguna Niguel, MA (US)

(73) Assignee: Quantum Corporation of New York, Inc., Incline Village, NV (US)

(*) Notice: Subject to any disclaimer, the term of this patent is extended or adjusted under 35 U.S.C. 154(b) by 147 days.

(21) Appl. No.: 11/824,586

(22) Filed: Jun. 29, 2007

(65) Prior Publication Data
US 2008/0011829 A1 Jan. 17, 2008

Related U.S. Application Data

(63) Continuation-in-part of application No. 11/641,304, filed on Dec. 19, 2006, now Pat. No. 7,337,949, which is a continuation of application No. 11/204,803, filed on Aug. 15, 2005, now Pat. No. 7,156,294, which is a continuation of application No. 10/827,737, filed on Apr. 20, 2004, now Pat. No. 7,066,383.

(51) Int. Cl.
*G06K 5/00* (2006.01)
(52) U.S. Cl. .................. 235/382; 235/375; 235/379; 235/380; 235/381; 235/383; 705/14; 705/39; 705/69
(58) Field of Classification Search .............. 235/375, 235/379–381, 383; 705/14, 39, 69
See application file for complete search history.

(56) References Cited

U.S. PATENT DOCUMENTS 4,949,256 A  8/1990  Humble 5,903,633 A  5/1999  Lorsch (Continued)

FOREIGN PATENT DOCUMENTS

CA  2 512 351 A1  1/2007

(Continued)

OTHER PUBLICATIONS

PCT International Search Report, for International Application No. PCT/US2008/007850, dated Sep. 24, 2008, 4 pages.

(Continued)

*Primary Examiner*—Allyson N Trail
(74) *Attorney, Agent, or Firm*—Hamilton, Brook, Smith & Reynolds, P.C.

(57) ABSTRACT

Systems and methods are disclosed for providing a provision of access to services. A time delimited, multiple use ticket/admissions card is provided that controls admission to services offered by participating service providers. The ticket/admissions card is issued to a ticket holder, and the card is valid for a certain amount of uses, where each use should be completed during a certain period of time. The first use of the card, for example, should be completed within a first time period, and if the first use is not completed during this first time period, then the first use expires; the second use of the card should be completed within a second time period, and if the second use is not completed during this second time period, then the second use expires. In this way, the ticket/admissions card provides a time delimited, multiple use scheme to control allowed admittance to authorized services.

38 Claims, 7 Drawing Sheets

U.S. PATENT DOCUMENTS

| | | | |
|---|---|---|---|
| 6,192,113 | B1 | 2/2001 | Lorsch |
| 6,422,462 | B1 | 7/2002 | Cohen |
| 6,594,640 | B1 | 7/2003 | Postrel |
| 7,066,383 | B2 | 6/2006 | Roth |
| 7,156,294 | B2 | 1/2007 | Roth |
| 2003/0050041 | A1 | 3/2003 | Wu |
| 2003/0053609 | A1 | 3/2003 | Risafi et al. |
| 2003/0194988 | A1 | 10/2003 | Knox |
| 2004/0011864 | A1 | 1/2004 | Thompson et al. |
| 2004/0039633 | A1 | 2/2004 | Nicholson |
| 2004/0068437 | A1 | 4/2004 | McGee et al. |
| 2004/0133511 | A1 | 7/2004 | Smith et al. |
| 2004/0158493 | A1 | 8/2004 | Nicholson |
| 2005/0021364 | A1 | 1/2005 | Nakfoor |
| 2005/0033639 | A1 | 2/2005 | Myers |
| 2005/0144074 | A1 | 6/2005 | Fredregill et al. |
| 2005/0230468 | A1 | 10/2005 | Roth |
| 2005/0283396 | A1 | 12/2005 | Rhodes |
| 2006/0235746 | A1 | 10/2006 | Hammond et al. |
| 2007/0016508 | A1 | 1/2007 | Lapointe et al. |
| 2007/0088610 | A1 | 4/2007 | Chen |
| 2007/0095889 | A1 | 5/2007 | Roth |
| 2007/0124209 | A1 | 5/2007 | Walker et al. |
| 2008/0052169 | A1 * | 2/2008 | O'Shea et al. ................ 705/14 |

FOREIGN PATENT DOCUMENTS

| | | |
|---|---|---|
| WO | WO 99/50733 A | 10/1999 |
| WO | WO 2006/026692 A1 | 3/2006 |

OTHER PUBLICATIONS

Notification of Transmittal of the International Search Report and the Written Opinion of the International Searching Authority, or the Declariation, with International Search Report and Written Opinion for PCT/US08/07851 mailed Dec. 29, 2008.

International Search Report for PCT/US05/13271 mailed Sep. 29, 2005, 1 page.

* cited by examiner

TIME DELIMITED MULTIPLE ADMISSION METHOD AND SYSTEM

RELATED APPLICATIONS

This application is a continuation-in-part of U.S. application Ser. No. 11/641,304, filed Dec. 19, 2006 (now U.S. Pat. No. 7,337,949), which is a continuation of U.S. application Ser. No. 11/204,803, filed Aug. 15, 2005 (now U.S. Pat. No. 7,156,294), which is a continuation of U.S. application Ser. No. 10/827,737, filed Apr. 20, 2004 (now U.S. Pat. No. 7,066,383). The entire teachings of the above applications are incorporated herein by reference.

BACKGROUND

In today's market, there are a variety of ways to make payment for goods and services. Payment can be tendered using cash currency, funds transfer between accounts, debit cards, credit cards, barter, frequent flyer miles, and prepaid cards, to name just a few methods. In the dynamic marketplace, customers might obtain vastly different goods or services for their payment.

There are many different prepaid business models in the marketplace. Conventional prepaid cards include a wide variety of financial products, including gift cards, phone cards, travel cards, flexible spending account cards, government benefit cards, subway system cards, employee incentive cards and payroll cards. These prepaid cards generally are in the form of a plastic card with a magnetic strip, bar code or embedded chip that permit the cardholders to access funds for the purchase of goods or services, much like a credit or debit card. Although prepaid cards have the appearance of credit cards and debit cards and they provide a form of cash, usually they neither involve credit nor are they tied to a cardholder's demand deposit account. Such cards are typically tied to a specified brand product or merchant service provider and have a set dollar amount or line of credit up to which the end user can spend in one or multiple uses. This form, therefore, presents the end user with concerns over price differentials between participating merchants (service provider) and increases in prices for the same goods or services. Because the card is designed for multiple-use bounded by a predefined dollar limit, the end user more often than not pays out of pocket for purchases over the dollar limit of the card.

SUMMARY

The present invention relates generally to marketing and distributing services, especially participatory sports or entertainment services, by collecting effectively a variable prepayment and issuing to a customer a ticket or similar indicia, which can be redeemed for a particular service. Preferably, the service is one that can be obtained at the customer's option from any of a plurality of distinct service providers, including providers that normally charge more or less than others for the particular service involved.

Systems and methods for providing a redeem-for-services program (electronic data or code, magnetic strip card, bar code, etc.) for a ticket card-holder to obtain services are disclosed. A ticket enables use of services offered by one or more service providers during valid use periods. A first use period is defined and enables a ticket holder to use the ticket during the first use period in exchange for admission to services offered by one or more of the service providers. A second use period is defined and enables the ticket holder to use the ticket during the second use period in exchange for admission to services offered by one or more of the services providers.

The second use period is different than the first use period. The second use period is set so that it commences on or after the expiration of the first use period. A third and subsequent use periods can likewise be defined. The third use period can be defined so that it enables the ticket holder to use the ticket during the third use period in exchange for admission to services offered by one or more of the service providers. The third use period commences on or after the expiration of the second use period. The first, second, and third use periods have respective time intervals. The time intervals of the first, second, and third use periods can be equivalent in length.

During the defined first use period, the ticket holder has the right to use the ticket at least once in exchange for admission to services offered by one or more of the service providers. During that time, the ticket can be processed and authorizes admission to one of the services as selected by the ticket holder.

After the expiration of the first use period, the right to use the ticket (with respect to the first use period) is caused to expire. The first use period can expire if the ticket holder fails to use the ticket within the first use period. If the first use period has expired, the ticket holder can be prevented from using the ticket. If the first use period has expired for failure to use the ticket within the delineated first use period, the ticket provider who issues the ticket receives value for the ticket holder's failure to use the ticket. The service providers, however, do not receive value for the ticket holder's failure to use the ticket. However, the rights to use the ticket during the non-expired parts of the second and third use periods remain in tact.

In response to the ticket holder selecting services offered by one of the service providers, the ticket is processed using a communications network to determine whether the ticket is valid. The communications network can be a credit card network, debit card network, or a private label network. The service providers can be authorized merchants that are part of the communications network. Each of the merchants access the communications network to process the ticket using an input/output port to a card processor of the communications network. The ticket is processed using the communications network, excluding any reporting of monetary value associated with the ticket, while reporting incremental credit information.

The ticket is redeemed using the communications network if the ticket is valid. The ticket is redeemed at a variable rate by debiting a price set by the selected service provider for the selected services. The price debited for services by a portion of the service providers is different from the price debited by other service providers for the same services, such that the ticket is redeemed at a variable rate among the service providers for the same services. The payment at the price debited for the selected services is effected. Any differences in prices debited by the service providers for substantially the same services are absorbed. The ticket is redeemed for multiple uses of the selected services. The ticket is redeemable for the selected services from the selected service providers, as opposed to a cash value.

If the ticket is valid and has been redeemed, the ticket holder is allowed to access the selected services. To determine that the ticket is valid, the ticket holder's desired use period is determined based on the time in which the ticket holder intends to use the ticket for admission to the selected services. The ticket holder's desired use period is compared with the valid use periods. If the ticket holder's desired use period is within one of the valid use periods, the ticket is determined to be currently valid. A ticket holder can make a reservation for use of the selected services to set the desired use period. The ticket holder may make the reservation using an online reservation system.

If the ticket holder's desired use period is not within one of the valid use periods, the ticket holder can be allowed to upgrade the ticket. The optional purchase of additional incremental value above the base ticket value of the ticket can be enabled.

The ticket may be presented by the ticket holder to the selected service provider in exchange for use of the selected services where the price debited by the selected service provider may be higher than the base ticket value.

The service providers can provide similar services. The similar services may be golf services, spa services, or movie theatre services for example.

The ticket can be implemented by using a card, using an electronic ticket, or using an access code.

The ticket can have a unique identifier. Upon purchase of the ticket by a customer, the ticket can be activated by a seller thereof. When activating the ticket the unique identifier of the ticket can be validated.

Based on the defined use period, the ticket is valid for redemption for a limited period of time (or multiple periods of time) after activation. In determining the use period, the service provider can verify the expiration date of the use period of the ticket.

A system for providing a provision of access to services is provided. A communications network is utilized for processing a ticket. A processor, in communications with the network, processes the ticket at a variable rate within two or more use periods. The two or more use periods can define time intervals in which the ticket is useable as a provision of access to services offered by the participating service providers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Redeem-for-Services

Unlike a traditional gift card with a specific monetary value, the present invention generally provides redeem-for-services system using a card or a ticket, which is not limited to a single dollar amount or store chain. The recipient of one of these inventive tickets has the flexibility to enjoy a particular type of goods or personal services, such as a golf, ski, spa, or movie experience, regardless of price variances, at the location and time of their choosing. The inventive ticket can be processed, for example, by simply swiping it through a standard credit card reader/network, or by simply entering in a pin number or access code.

Figure 1:
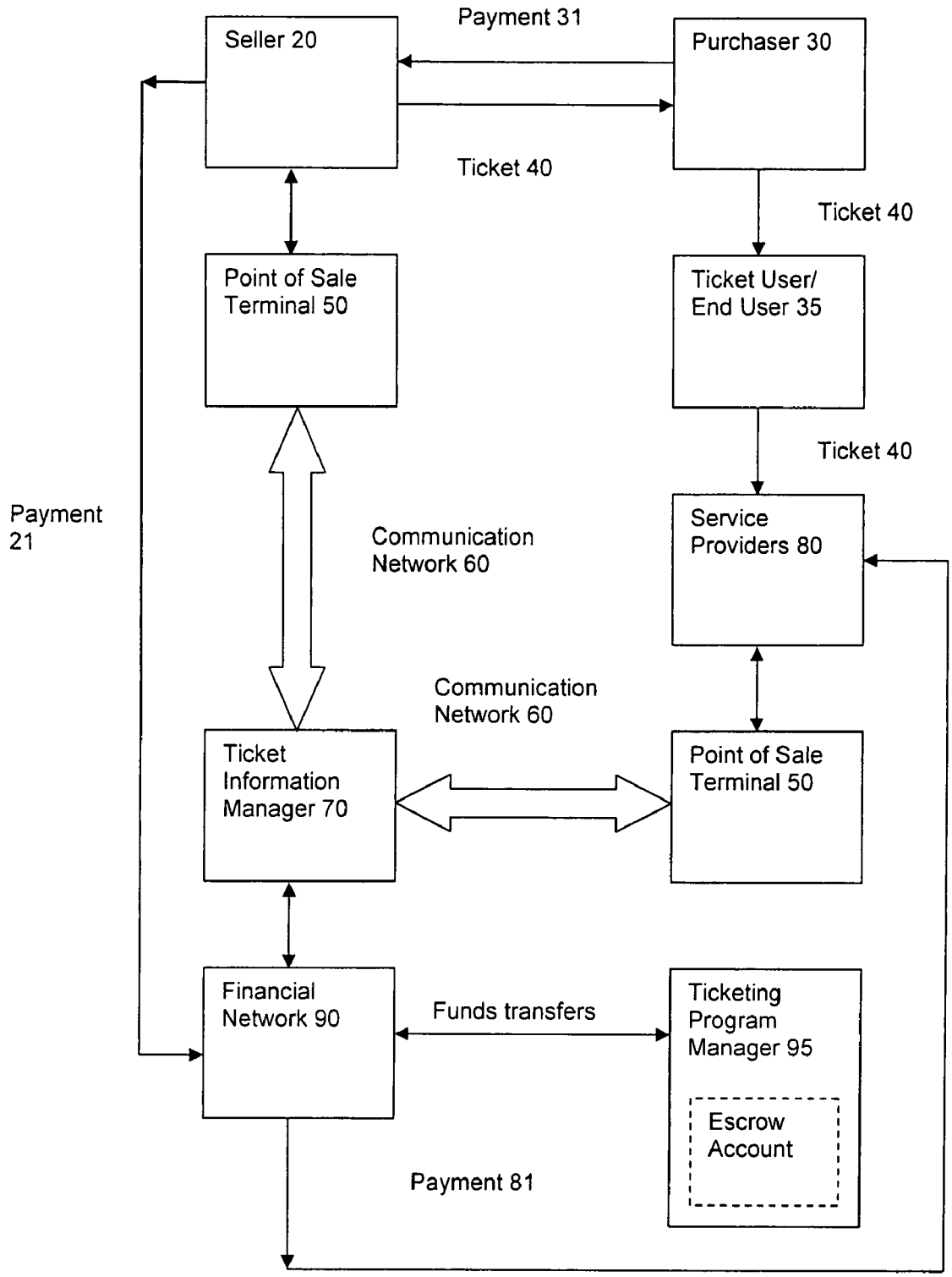
FIG. 1 is a block diagram illustrating an example overview of a redeem-for-services system according to an embodiment of the present invention.

FIG. 1 is a block diagram of an example overview of a redeem-for-services system 10 according to an embodiment of the present invention. In this example, the redeem-for-services system 10 includes the following parties: a seller 20, purchaser 30, end user/ticket user 35 and service provider 80. A ticket information manager 70, financial network 90 and ticketing program manager 95 support the apparatus and affect the transactions among the parties of system 10.

For the end user 35, the present invention provides unique access to goods or services. The unique access code, for example, can be 16 digit identification number, which can be booked online. Preferably, a ticket 40 that includes the unique access code is provided. The ticket 40 is for a specified service that is acceptable at multiple participating service providers 80. The service providers 80 provide similar services. The ticket 40 is for one or more uses at any one of the multiple participating service providers 80 of the end user's choosing. Because the participating service providers 80 may have different prices for the subject service, the inventive ticket 40 is redeemable at a variable rate.

Any of the service providers 80 can increase the price of the subject service between the time the ticket 40 is originally issued and the time the ticket 40 is used, and the variable rate redemption will cover the increased price. To the end user 35, the ticket 40 provides full payment for the subject service no matter what the cost differential from one service provider to the next or the increase in price by an individual service provider 80 over time. That is, to the end user, the experience in using the inventive ticket 40 does not differ depending on the service provider 80 selected by the end user 35 (even if the end user selects the service provider with the highest price for the subject service or a service provider who has increased the price of that service). The end user 35 does not need to pay out of pocket for the cost differential. The cost differential is absorbed by the ticket information manager 70. As a result, the inventive ticket 40 represents to the end user 35 the subject service paid in full and serves as a one time access to the service.

By way of contrast, traditional gift cards and credit cards provide a form of cash. Such cards have a set dollar amount or line of credit up to which the end user can spend in one or multiple uses. With conventional gift or debit cards, the user typically faces concerns over price differentials between participating merchants (service providers) and increases in prices for the same goods or services. The user has a different experience in using the gift or debit card depending on merchant selected. Because conventional gift/debit cards are designed for multiple uses, bounded by a predefined dollar limit, the user more often than not pays out of pocket for purchases over the dollar limit of the card.

While traditional credit/debit or gift cards effectively represent a dollar for dollar cash equivalent, usable multiple times for goods/services of the end user's choosing, the variable rate redemption of the present invention provides a ticket 40 for a prespecified service.

Figure 2:
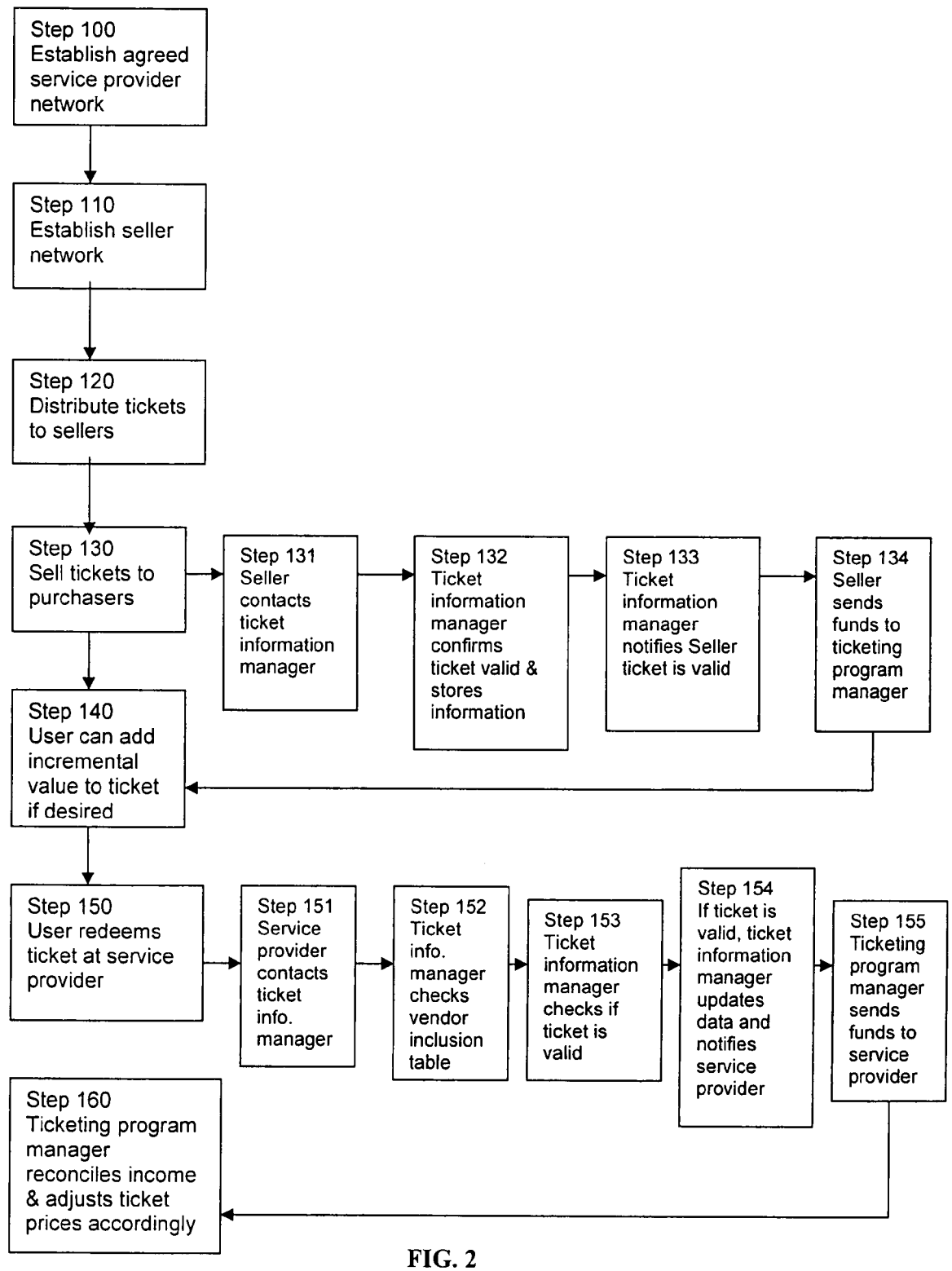
FIG. 2 is a flow diagram illustrating steps of an exemplary embodiment and method of administering the invention services system.

Referring to FIGS. 1 and 2, at step 100, a ticketing program manager 95 desiring to implement the redeem-for-services system 10, preferably for a particular type of entertainment or personal service, enlists a plurality of service providers (merchants) 80 of one or more substantially comparable services. In at least one embodiment, providers 80 are under contract to honor the inventive ticket 40 according to the procedures described herein, namely to accept the ticket 40 in exchange for provision of the provider's 80 regular services and to seek remuneration for such services from the system maintained by the ticketing program manager 95.

The ticketing program manager 95 enlists the service providers 80 as members of a network of similar service providers (e.g. a common group enterprise or industry). The provider's membership in the common group enterprise helps advertise the provider's services. Likewise, membership in the enterprise can further benefit individual providers, through additional advertising, access to new clientele and association with a product (the ticket 40) that may be promoted as having a certain desirable cachet in and of itself. In addition, it can be desirable that the service providers accept the ticket 40 at all times they are open, so that a "no-blackouts" feature of the ticket 40 will enhance its acceptance in the marketplace and add to the desirability of receiving such a pass as a gift. However, it is not strictly necessary for the provider 80 to undertake any particular responsibilities other than to provide the same services to ticket user 35 as the provider 80 provides to regular cash customers.

The service providers 80 can provide at least one same stated service or article of goods, for example, a round of golf, a day's worth of skiing or treatment at a health spa or the like. The ticket 40 is a time delimited, multiple use ticket/admissions card that controls admission to the services offered by participating service providers. Each use of the ticket should be completed during a certain period of time. The first use of the card, for example, should be completed within a first time period, and if the first use is not completed during this first time period, then first use expires; the second use of the card should be completed within a second time period, and if the second use is not completed during this second time period, then the second time use time period expires. In this way, the ticket 40 provides a time delimited, multiple use scheme to control allowed admittance to authorized services.

A broad network of providers of like services who accept the ticket 40 improves the marketability of the ticket 40, since the ability for the user to select among a variety of convenient providers is a desirable feature and one which can differentiate the ticket 40 from ordinary gift cards or other indicia redeemable only at the retailers from whom it was purchased. Various providers 80 can provide somewhat different services and may assess different charges, up to a threshold of difference within which the providers are considered to provide the "same" service as authorized and redeemable by presenting the one time use ticket 40. As used herein, a "same" service contemplates like services, equivalent services and similar.

Therefore, while the particular service for which a ticket 40 is to be used is nominally the same service for that series of ticket (e.g., for tickets sold for redemption for a uniquely named or described service), the service providers 80 need not all agree to provide identical services or to charge a dictated price for their services. Within the threshold of comparable pricing, differences in services can be accommodated owing to such factors as specific service component differences, location, prestige and quality, or other differences, as well as arbitrary consumer preferences. Preferably, even though the ticket 40 is sold for a given price and is redeemable for such services at any of the service providers 80, the service providers 80 do not need to each accept identical payment value for their services.

Setting the Price of the Ticket

The ticketing program manager 95 sets the price charged by seller 20 for sale and activation of the ticket 40, so as to accommodate variations in actual service provider prices. The inventive tickets can be priced, for example, according to leveled access (levels of access to services afforded by the ticket) as described in application Ser. No. 11/824,535, filed Jun. 29, 2007, the entire teachings of which are incorporated by reference. A standard ticket can be pre-loaded at least with level one access, while tickets for services that are in mid-to upper level price ranges, can be pre-loaded with level two or level three access. Each participating golf course location, for example, can be associated with a specific level. An online directory can be provided to distribute information about each golf location and its associated level(s). These levels can be applied to each golf ticket as an indication of the golfing experience, for instance, to allow for seasonal and resort style play.

Establishing Relationships with Sales Outlets

Referring back to FIGS. 1 and 2, after the service provider relationships have been established (step 100) or while that is occurring, the ticketing program manager 95 establishes relationships with existing sales outlets or ticket distributors (step 110) who will sell the tickets 40. The sellers 20 have point of sale terminals 50 connected to an existing network 60, such as a credit/debit card network or private label network, that allows fast, efficient communication with the ticket information manager 70. This communication is desirable for the transfer of the information required to initialize a ticket 40 once it has been purchased. If the existing network is connected to a financial network 90, such as that maintained by a credit card company, this can also facilitate the automatic transfer of funds between the sellers 20 and the ticketing program manager 95 and between the ticketing program manager 95 and service providers 80. For example, the credit card company can maintain an escrow account for the ticketing program manager 95, into which funds are transferred from the sellers and from which funds are withdrawn to pay service providers. By using an existing credit card network as the financial "rail" for the system, funds transfers can be managed with minimal day to-day involvement from the ticketing program manager 95. While the use of an existing credit card network as the communication network carries certain advantages, it is also possible for the communications to take place over an Internet connection (for example to a secure web page hosted by the account manager) or a telephone connection to either "live" operators or an Interactive Voice Response system connected to the ticket 40 information manager's (70) data storage equipment.

In one exemplary embodiment, the ticket information manager 70 has a communications link or other access to a financial network 90 which is a credit card provider's network. When a ticket 40 is swiped on a point of sale terminal 50 at either the seller's end or the service provider's end, the credit card network will communicate (at 60) with or otherwise access the ticket 40 information manager's 70 equipment. The ticket 40 verification or validation and approval of service providers are handled directly by the ticket information manager 70. The ticket information manager 70 simply returns an accept or reject message to the credit card (financial) network 90, which then either causes the transaction to be processed at the point of sale terminal 50 or cease.

In an alternative embodiment, the ticket issuer can be a commercial organization other than a seller 20, with communications equipment or the like to activate the ticket 40 through communications with the ticketing program manager 95.

Distributing and Configuring the Tickets

Once relationships with the sellers 20 and service providers 80 are established, the ticketing program manager 95 distributes the tickets (step 120). Preferably the tickets are distributed at first in an un-initialized state, namely functional but not yet validated for use. A validation process includes placing suitable codes or notations on the tickets or storing codes in the tickets or elsewhere in a data storage medium that is accessible over a communication network. These codes can be checked when determining whether to permit use of the tickets to redeem-for-services by a service provider.

In one embodiment, the tickets have a preprinted unique identification code and a magnetic strip or other means of recording information. The strip or other means can be pre-recorded with a unique or at least substantially unique identification code for each ticket. The unique identification code may be an alphabetic code, a numeric code, an alpha numeric code, or other appropriate identification code capable of uniquely identifying an individual ticket, and perhaps also identifying the related type of service (e.g., golf, spa, etc.). In an alternate embodiment, the tickets do not have a preprinted or prerecorded identification code, but do contain a recordable medium such as a magnetic strip or an electronic storage device, which may be loaded with a unique code preliminarily or may have an area in which such a code is inserted as a part of the initialization procedure.

The issued ticket 40 can be configured and formatted with certain indicia characteristic of a standard credit card. This can include printed or embossed account identification numbers, a magnetic strip or on board integrated circuit memory, a one or two dimensional optical bar code, etc. The information can be prerecorded or at least partly recordable. Two or more redundant means for storing the same information, such as an account number, which identifies the allowed use periods associated with the ticket, can be provided for data entry in different optional ways, or the different storage techniques can be used for information that is otherwise cross referenced. Advantageously, the ticket 40 has sufficient information carried thereon to permit use of the ticket 40 substantially in the same physical manner as a standard credit card, namely using equipment conventionally provided at a point-of-sale terminal 50 (scanners, magnetic strip swipe readers, keyboards, etc.).

Figure 3:
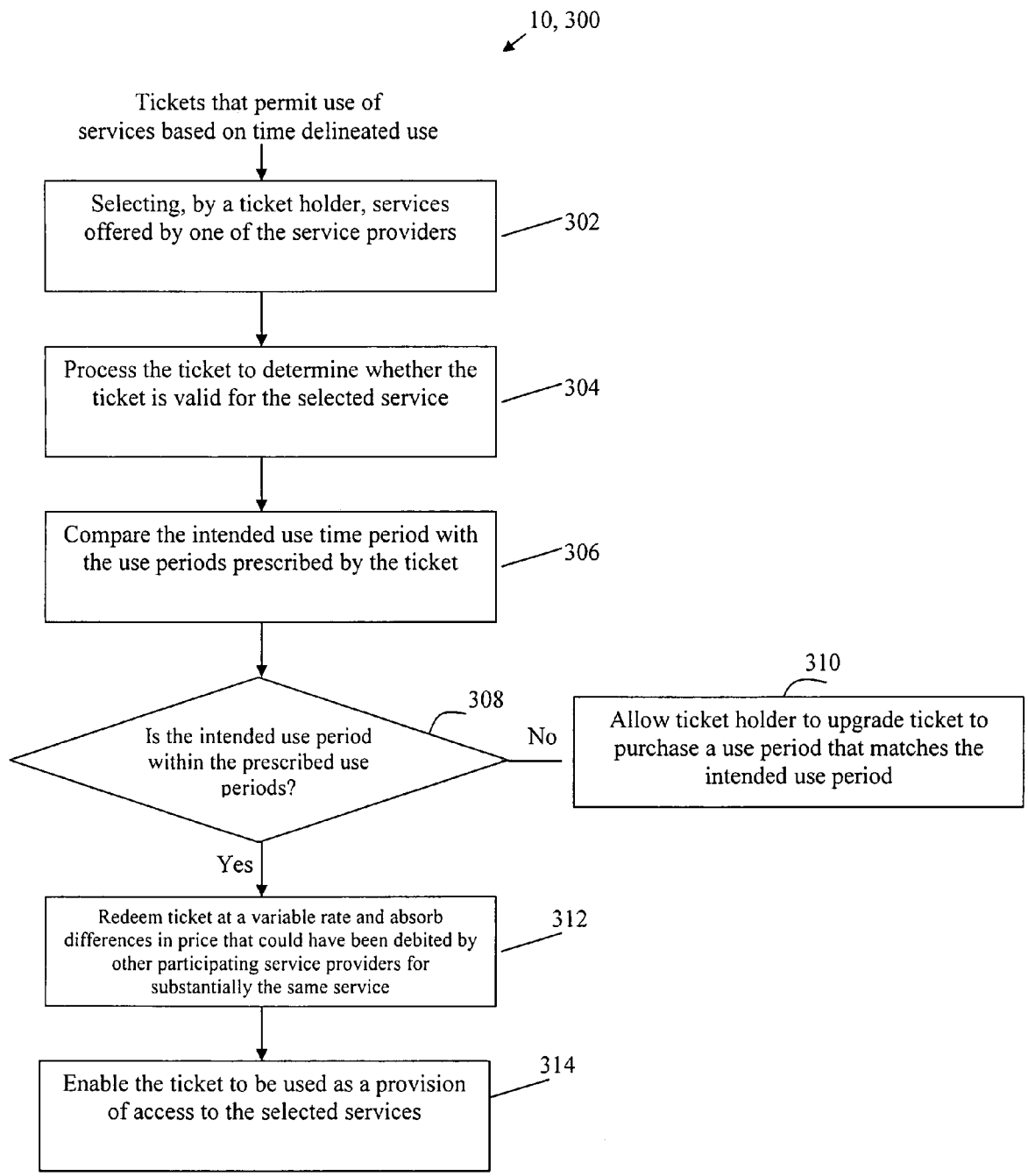
FIG. 3 is a flow diagram illustrating an overview of the process of using time delimitated tickets according to an embodiment of the present invention.

In accordance with the present invention, the issued ticket 40 is configured such that it provides a time delimited, multiple use ticket that controls admission to services offered by participating service providers. FIG. 3 is a flow diagram illustrating an overview of the processing 300 of such time delimitated tickets 40 according to an embodiment of the present invention. The issued ticket/admissions card 40 is issued to a ticket holder 35, and the card is valid for a certain amount of uses during certain time periods. Each use should be completed during a respective (defined) certain period of time. At step 302, the ticket user holder 35 selects a service from one of the participating service providers 80, where the ticket holder intends to use the ticket. The ticket 40 is processed at step 304 to determine whether the ticket is valid for the selected services, and at 306 the use period in which the ticket holder intends to use the ticket is compared with the use periods that are prescribed with the ticket. The ticket 40 can have any number of prescribed use periods. The first use of the card, for example, should be completed within a first time period, and if the first use is not completed during this first time period, then the opportunity for the first use expires; the second use of the card (ticket) 40 should be completed within a second time period, and if the second use is not completed during this second time period, then the second time use time period expires. In this way, the ticket/admissions card 40 provides a time delimited, multiple use scheme to control allowed admittance to authorized services.

At 308, if the intended use period does not match one of the use periods associated with the ticket 40, then at 310 the ticket holder 35 can upgrade the ticket to purchase a use period that matches the intended use period. If the intended use period matches a use period currently associated with the ticket 40, then at 312 the ticket 40 is redeemed. As discussed in more detail below, the ticket 40 can be redeemed at a variable rate redemption. Any differences in price between the various participating service providers for substantially the same service is absorbed by the initial ticket issuer. At 314, the ticket user is allowed to use the ticket as a provision of access to the selected services during the current time period.

Figure 5:
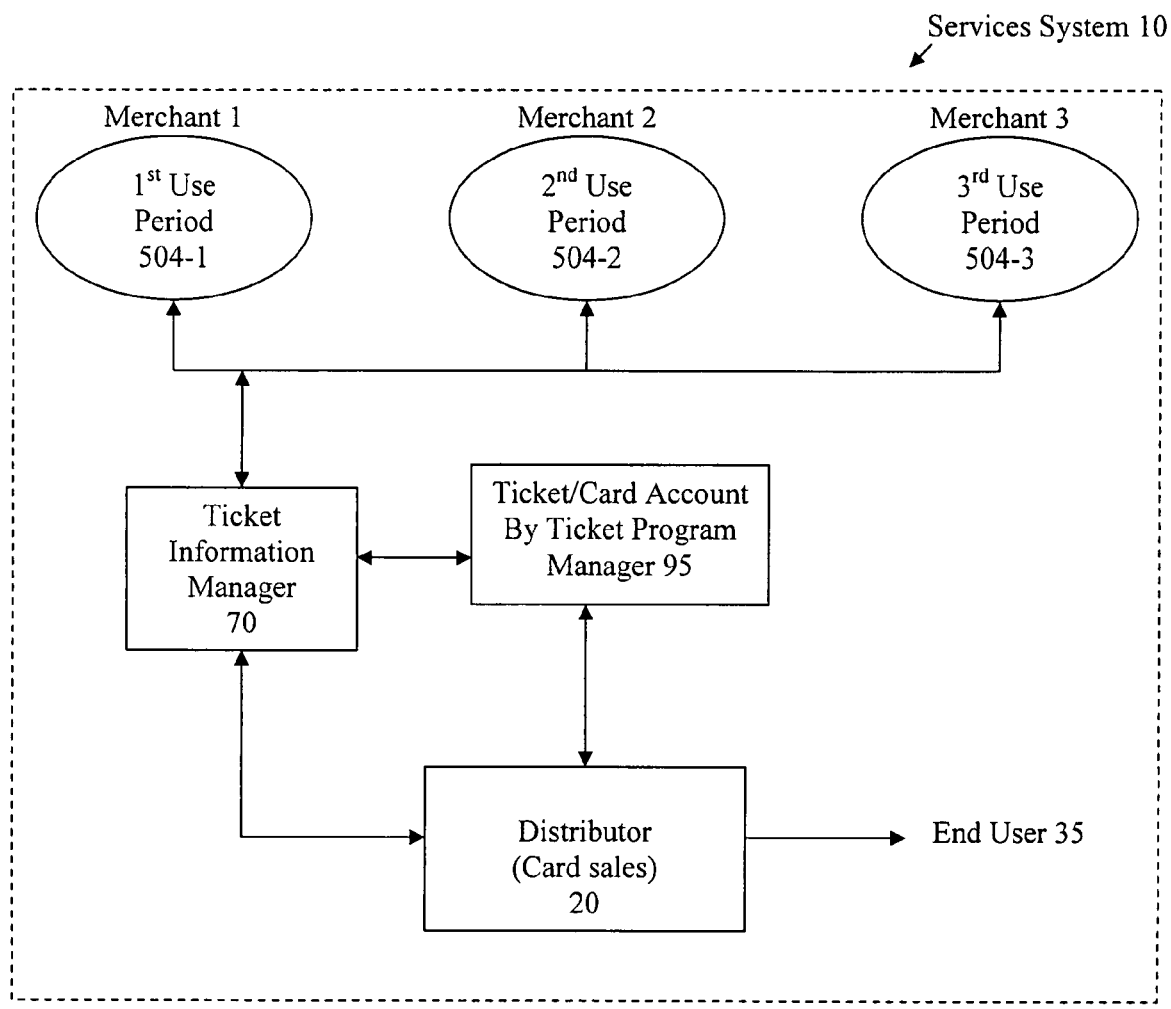
FIG. 5 is a block diagram of an example redeem-for-services system in which merchants accept the various use periods associated with a ticket according to an embodiment of the present invention.

Each time-based use of the ticket 40 may be used at a different participating service provider 80. For instance, if the ticket 40 is configured so that it enables admission to services for three different use periods, each use period can be applied at a different merchant. FIG. 5 is a block diagram of an example prepaid or redeem-for-services system in which merchants accept the various use periods associated with the ticket. As shown in FIG. 5, a ticket holder (end user) 35 selects Merchant 1 to redeem its first use period 504-1, and then the ticket holder 35 selects Merchant 2 to redeem its second use period 504-2. Merchants 1 and 2 can require different prices for the selected services. Any difference in prices are not made apparent to the ticket holder 35. Any difference in prices for the services are absorbed by, for example, the ticket program manager 95.

Figure 4:
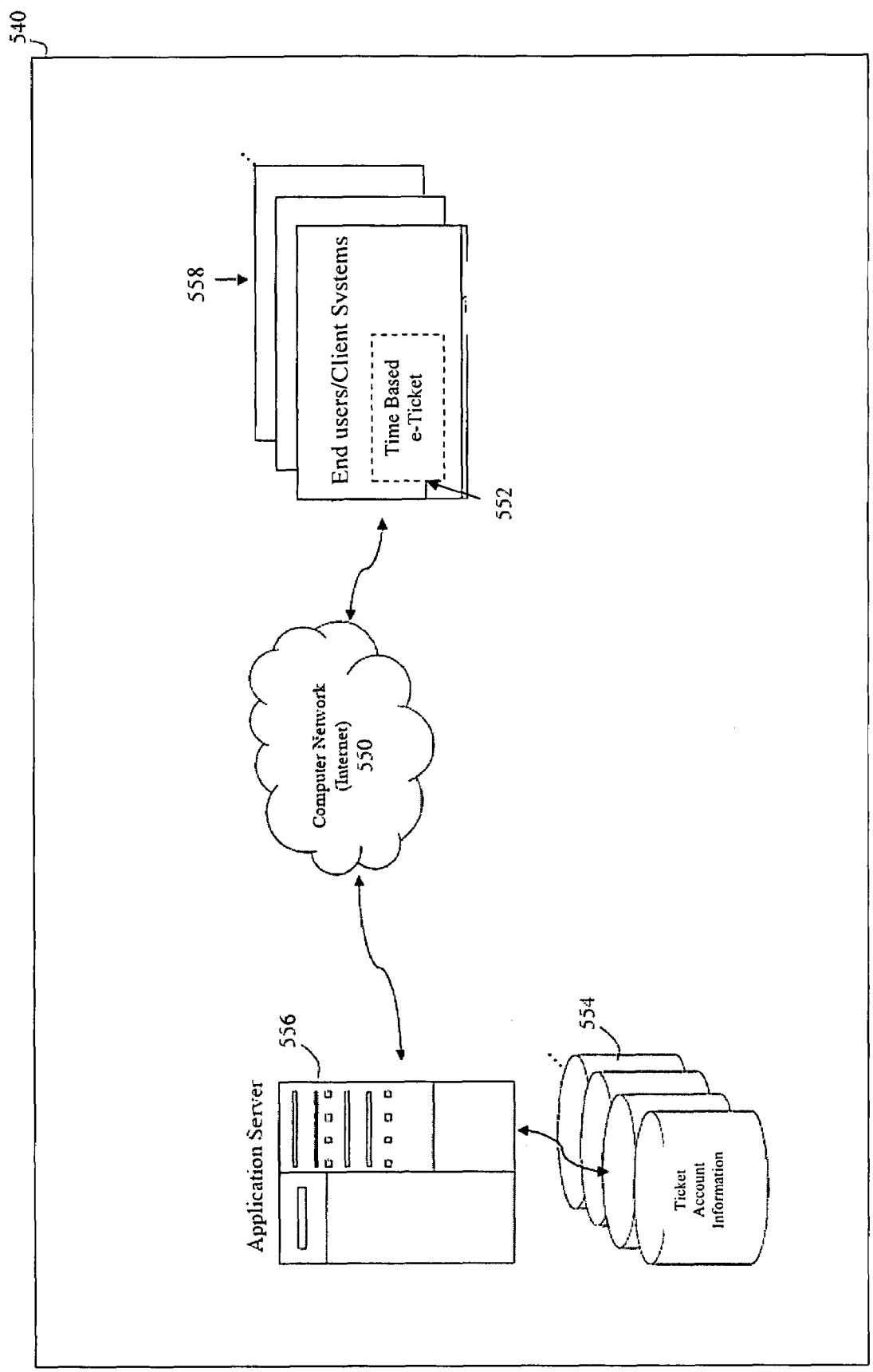
FIG. 4 is a block diagram of an example online environment for processing an electronic ticket according to an embodiment of the invention.

Instead of preloading a card with the ticket information, an e-ticket (electronic ticket) can be provided. FIG. 4 is a block diagram of an example online environment for processing an electronic ticket according to an embodiment of the invention. An application server 556 can host the ticket account information 554. End users at client systems 554 can access their ticket information 554 and download an electronic copy of their time delimited e-ticket 552. An e-ticket can be a paperless electronic document or qualifying data. When an end user, for example, reserves a golf T-time or movie seat by telephone or using global computer network communications, the details of the reservation can be stored electronically at the application server 556. The end user can download a copy of the electronic ticket locally to their hard drive 558, or print a hardcopy of the reservation, but preferably, in this implementation, the hard copy would not be required for admission to the desired service/service provider 80. A confirmation number can be assigned to the end user's reservation, along with the date(s), and location(s). For admittance, the end user can simply present positive identification or a confirmation code, access code or PIN number.

Referring back to FIGS. 1 and 2, the ticketing program manager 95 reserves for itself a series of digits or numbers or number combinations in a standard credit card format that are unique to the account manager and identify one or more accounts associated with the ticketing program manager 95. Initialization and validation steps, which are processed by a ticket information manager 70 can be undertaken over an existing communication network 60, which preferably is a network that processes conventional credit/debit cards, or can be another public or private data communication network. Other types of communication devices may be used instead of or in addition to a standard point-of-sale terminal 50 programmed to handle credit cards, so long as the device is capable of communicating sufficient ticket information over an operable communications network. For example, in another example implementation, the ticket information can be transmitted between the seller 20 and the ticket information manager 70 by telephone either by voice in association with a live operator or through a telephone keypad to an Interactive Voice Response system.

The ticket 40 proceeds through several steps associated with initial issue, sale (preferably with validation concurrently upon sale), and later presentation as an identification of value used to present remittance for a service. At step 130 (FIG. 2), the purchaser 30 selects a ticket 40 for purchase and pays the seller 20 some agreed purchase price 31. This transaction can be a conventional retail, wholesale or other transaction in which one or more tickets are exchanged for cash or credit or other remuneration.

At step 131, the seller 20 activates the ticket, preferably, including transmitting an identification code that is or becomes associated with the ticket 40 (e.g., is at least partly read from or written onto or otherwise associated with the ticket). The identification code is at least substantially unique to the ticket 40 and is transmitted over the existing communications network 60 to the ticket information manager 70 or to a data store associated with the ticket information manager 70. If the system is such that the ticket 40 already has a preprinted or recorded identification number, the ticket information manager 70 compares this number with the numbers of tickets that it has previously distributed to sellers as one step in determining validity. If the ticket 40 has a valid number that has not already been processed, the ticket 40 information manager records the ticket's number, noting for example in a data memory that the ticket 40 has now been purchased and should be authorized for use. Other information is also preferably recorded, including at least the purchase price and the date of the sale transaction (step 132). The ticket information manager 70 preferably acknowledges by communication back to the seller that the ticket 40 is valid and now has been initialized (step 133), although the acknowledgement can be deferred or accomplished off line.

The seller 20 then accepts payment 31 from the purchaser 30 (who might or might not be the ultimate ticket user). At step 134, the seller 20 transfers payment 21 to the ticketing program manager 95, preferably, through a financial network 90 such as a credit card network. If a credit card network is used, funds can be automatically transferred to an escrow account maintained with the credit card company for the ticketing program manager 95. Although the seller could have previously paid the ticketing program manager 95 in full for the tickets and then resells them to customers, it is preferable that payment to the ticketing program manager's escrow account is made from funds received from the purchaser 30. Therefore, payment 31, 21 is transferred to or for the benefit of the ticketing program manager 95 when payment is tendered by the purchaser 30. The payment 21 to the ticketing program manager 95 (or it's escrow account) is the payment tendered, less a portion of the sale price that is due to the seller (step 134) in consideration of making the sale.

If the communication network 60 is an existing credit card network, credit can be transferred immediately to the ticketing program manager's 95 account. In another embodiment, the initialization process can take place over a global computer network (the Internet), e.g., via a secure web page hosted by the ticketing program manager 95 or another party providing account transfer services. For example, payment to the ticketing program manager's escrow account can be effected through available Internet payment mechanisms such as Pay Pal, which provides for value transfer to end user's accounts. Otherwise, the seller 20 can remit funds owed to the ticketing program manager 95 on an invoiced or other basis. Because the initialization of the ticket 40 (steps 131-133) is preferably performed through the ticket information manager 70, an exact, up-to-date record is maintained of how many tickets each seller has sold, and at what price. This facilitates accountability and correct payment to the ticketing program manager 95 or into its escrow account.

Using the Ticket

Once purchased, a ticket 40, may be used by the purchaser 30 or by someone to whom the purchaser has conveyed the ticket, for example as a premium or as a gift for redemption, etc. The ticket 40 is used as a representation of value used as remittance at any of the service providers services during the intended use period, which matches the defined use periods associated with the ticket. Inasmuch as the end user 35 might or might not be the same party as the purchaser 30, for the purpose of this description, the term "user" or "end user" should be construed to encompass an initial purchaser or anyone to whom the purchaser has conveyed the ticket 40.

A ticket user 35 presents the ticket 40 to a service provider 80 at step 150 in order to redeem the indicated service. At step 151, the service provider, preferably, verifies the validity of the ticket 40, including its defined ticket use periods, by data transfer to the ticket information manager 70 over the communications network 60. If the communications network is one that is maintained by a credit card provider, the credit card provider's equipment would recognize the unique identification code as being not an ordinary credit card but a time delineated ticket 40 and would contact the ticket information manager 70 to perform verification of both the service provider's inclusion in the program and the time period and overall validity of the individual ticket. As a first check, the ticket information manager 70 will verify that the service provider 80 is among those who have agreed to accept the tickets for the current time period of use. (Step 152). This may be accomplished by the storage of an inclusion table (with corresponding time periods of participation) by the ticket information manager 70. If the communications network is a credit card network, the initial screening for whether a service provider 80 is listed in an inclusion table can also be made by the credit card service provider. The unique identification code associated with the ticket 40 is read at the point of sale terminal 50 of the service provider 80 and then transmitted to the ticket information manager 70. At step 153, the ticket code is compared with a list of codes stored in a data base maintained by (or for) the ticket information manager 70, namely, a list of valid ticket codes for initialized but as-yet-unused tickets. If the ticket code is valid and the ticket 40 has not yet been used, the ticket information manager 70 returns a message to the service provider (via the credit card network if employed as part of the system) that the ticket 40 is valid. This indicates to the service provider 80 point of sale that the user may redeem time based use of the service provider's services, such as the aforementioned round of golf, day of skiing or treatment at a health spa or the like during the defined time period. The ticket information manager 70 then records data referenced to the ticket code to represent that the ticket 40 has been used, so that the ticket 40 may not be used validly again during that same time period (step 154).

By communicating to the service provider 80 that the ticket 40 is valid, the ticket information manager 70 basically indicates that the ticketing program manager 95 will remit payment 81 to the service provider 80 in the amount of the purchase price of the service for which the ticket user 35 has presented the ticket 40. If a credit card provider is serving as the financial network and the communications network 60, the ticket information manager 70 can signal the credit card provider to release funds from an escrow account maintained for the ticketing program manager 95 directly to the service provider's account. To facilitate validation, it is possible for a service provider that offers various services to report to the ticket information manager 70 that a particular service is being redeemed, whereby the ticketing program manager 95 can account for the amount to be remitted. Finally, the ticket information manager 70 sends a notification to the financial network 90 that a ticket 40 has been redeemed, at which point the financial network provider transfers payment 81 from the ticketing program manager's 95 account to the service provider's account. (Step 155).

When the communications network 60 is (or links with) an existing credit card network, credit for the funds may be transferred from the ticketing program manager 95 (or its escrow account maintained by the credit card network) to the service provider's account immediately in the same way as a credit card transaction, but, preferably, the purchaser 30 and end user 35 are not privy to the accounting details of service price and the like. Preferably, it is not necessary for the end user 35 to present identification or sign receipts or the like, because the monetary transaction is between the ticketing program manager 95 and the service provider 80.

Although a credit card network can be used, the communications network can be another public or private data communications network, such as an Internet connection to a web page hosted by (or for) the ticket information manager 70 or alternatively by the ticketing program manager 95. The ticketing program manager 95 can transfer funds to the service provider using a variety of Internet-based services, such as Pay Pal, Bill Point, etc. Otherwise, the ticketing program manager 95 can make payment by check or other means to service providers 80 on a periodic basis to account for the number of users that have used that service provider's services since last payment. It will be recognized that the separate functional blocks depicted in FIG. 1 as ticket information manager 70 and ticketing program manager 95 may be performed by the same entity. Further, ticket information manager 70 and ticketing program manager 95 may be implemented as one or more processing engines (e.g. a redeem-for-services ticket engine) or other processor-like units. It should be recognized that an escrow account can be maintained either by the ticketing program manager 95 as depicted in FIG. 1 or by the financial network 90 on behalf of the ticketing program manager 95. Other configurations and arrangements are suitable.

If, at step 153, the ticket information manager 70 determines that the ticket 40 does not have a valid identification code, or has a code for a ticket 40 that has already been used once, then a message is returned to the service provider 80 indicating that the ticket 40 is not valid and that the service provider should not accept the ticket 40 as payment for services. A similar message would result if, at step 152, the ticket information manager 70 does not recognize the service provider 80 as one who has agreed to participate in the prepaid leisure activity services system, or where the intended use period does not match the use periods associated with the ticket.

Preferably, the ticket 40 provides information and enables the end user 35 to obtain and remit for an incremental service, as opposed to an incremental sum of money. The various service providers 80 may charge different amounts for similar or different services. A given service provider may assess different charges at different times for its particular services. Preferably, the different charges are within the threshold price range associated with the ticket level as described in application Ser. No. 11/824,535, filed Jun. 29, 2007, the entire teachings of which are incorporated herein by reference. The services can be associated with different levels for different times of day. For instance, golf services offered by a golf provider can be assigned a Level One rating during periods of less than maximal use or demand, such as off-peak hours, while its services can be assigned a Level Two rating during peak hours.

Referring back to FIGS. 1 and 2, from the end user's standpoint, the system treats the ticket 40 as the mechanism to provide an increment of services (or possibly goods) apart from these pricing considerations, which is advantageous. At step 160, after the system 10 has been in operation for some period of time, the ticketing program manager 95 can compare and reconcile any overage/underage on proceeds received on tickets 40 presented for higher or lower priced service providers 80 and/or sold by sellers 20 with higher or lower markups. Accordingly, the ticketing program manager 95 adjusts pricing and payment strategies or provider membership arrangements, if necessary. These differences are absorbed and averaged by the ticketing program manager 95, who can make certain decisions about how the system 10 is run and how tickets 40 are leveled (threshold ranges) and priced. For example, the ticketing program manager 95 may decide based on experience to adjust the sale price of future tickets 40 and/or to adjust the threshold price range per level of tickets. Further, a ticketing program manager 95 may determine that certain sellers 70 and/or providers 80 will or will not become or remain active, with competition and supply and demand causing the market to reach an equilibrium. However, because the ticket 40 represents credit toward a service (or a prepaid or credited service) and not a monetary value to the users, a change in price for new ticket purchases will not affect the redeem-ability of tickets already purchased.

Upgrading a Ticket

The purchasers 30 or ticket users 35 can be provided with the ability to add a limited amount of incremental value to the ticket 40 (an upgrade), either at time of initial ticket purchase or at any time after purchase and prior to redemption of the ticket 40 for services (step 140 in FIG. 2). The addition of incremental value can allow the ticket user to upgrade the use period of the ticket so that it matches the intended use period. The feature incorporating the addition of incremental value can apply to allow use of the ticket 40 at service providers 80 whose services are priced significantly higher than the initial value of the ticket 40. When a user 35 intends to redeem the ticket 40 for a use period that does not match the ticket's prescribed use periods, incremental value can be added to the ticket. Incremental value need not necessarily be an integer multiple of the ticket's initial value, but can be a fraction of the initial value. Preferably, the ticket 40 reflects incremental values, or credits, to the user 35, and not monetary value. While the ticket information manager 70 may store for each ticket data representing the actual monetary value that has been purchased by the ticket user, any features that allow the user to retrieve information about the ticket 40 (such as Interactive Voice Response or Internet access described more fully below) will preferably return incremental credit information and not monetary value to the user 35. This distinction reinforces the premise that the ticket 40 represents the ability to redeem a service from agreed providers 80 regardless of the cost of that service.

Additional incremental value can be used to allow the user to redeem the ticket 40 to accommodate providing the service to additional people at the time of redemption, for example, so that the user and a guest or guests can pay for all of their rounds of golf on the ticket 40. Preferably, a ticket 40 with additional incremental value, like an initial ticket, cannot be presented on more than one occasion. Instead, the ticket 40 is marked and can be used as a ticket 40 for a given service, and adding increments refers to adding (or perhaps changing) the service that is provided when the use is redeemed by one or more associated users. It will be recognized that the incremental upgrades for higher-priced service providers (services associated with higher levels or with particular use periods) and for allowing additional guests can also be combined to allow either or both options as part of the method.

In another embodiment of the invention, a user can purchase additional incremental value directly from the ticketing program manager 95, or an agent 20 of the ticketing program manager 95 as shown in FIG. 5A. This can be implemented in various ways, including via telephone or a global computer network.

A telephone-based method for allowing purchase of additional incremental value can be implemented either with "live" operators who respond to users' telephone calls or with Interactive Voice Response (IVR) equipment. In a live operator system, the operators will have access to the ticket information manager's database of ticket 40 and, if applicable, user information and can search, access and modify the information via a computer terminal or like device. Another option provides for the ticket information manager 70 (or, alternatively the ticketing program manager 95) to maintain an (IVR) system that is entirely computerized. Users who call to add additional value to their tickets will do so by entering numbers on the telephone keypad, in response to computer generated messages, such as "Please enter 1 to add value to your ticket. Now enter your 16 digit ticket number followed by the pound sign." Ticket information can be read back to the user with voice simulation or prerecorded messages stored as a part of the IVR system. It is also possible to combine live and IVR systems so that users have the option of performing the transaction with a person or a computer.

A further embodiment of the system provides for Internet-based account management. The ticket information manager 70 (or, alternatively the ticketing program manager 95) maintains computers connected to the Internet and programmed to allow users to access and update ticket information or upgrade ticket value via a web page. The web address is preprinted on the tickets or on the packaging with which the tickets are sold. Upon entering the ticket information manager's 70 secure web site, users are asked to enter the unique identification code of their ticket. The ticket information manager's 70 computer checks the ticket number against the database of valid ticket numbers and if the number is valid, allows the user to add value to the ticket and pay for the transaction through a standard credit card. In turn, the ticket information manager's 70 database is updated to reflect the additional value added to the user's ticket 40 and credit is added to the ticketing program manager's 95 account. In an Internet based option, the user can also use the Internet to simply verify ticket value or expiration date and once connected to the ticket information manager's 70 web page also search for service providers in the user's locality, or in a travel destination where the user expects to redeem the ticket. This feature gives added value to service providers since the web access gives the service providers an opportunity to provide web page links with customized advertising or other information in addition to standard information provided by the ticketing program manager's 95 web site.

In any embodiment of the invention that allows user retrieval of ticket information, the actual cash value that has been purchased in connection with the ticket 40 is preferably never available to the user, only the number of incremental credits loaded onto the ticket and/or current useable ticket level.

Those skilled in the art will recognize that the ticket information manager's 70 database can be set up to store information beyond the ticket number and value associated with a ticket. For example, user identification information such as name, address and e-mail address can be stored at the time a user purchases a ticket. Storage of this information would, for example, allow the ticketing program manager 95 to replace a lost ticket upon presentation by the user of such personal identification information. The ticket information manager 70 can search its database for a user's name and determine whether the user's ticket 40 has been redeemed. If the ticket 40 has not yet been redeemed, then the lost ticket number can be canceled and a new ticket 40 issued to the user. This transaction could be implemented either in person through a seller or with the ticketing program manager 95 (or, alternatively, the ticket information manager 70) via telephone or a global computer network (the Internet) as described above. Recordation of user information can also provide a valuable feature to service providers who, if given access to such information (either for a fee or by other agreement with the ticketing program manager 95) can access that information for marketing purposes, and can target marketing specifically to users who have redeemed their tickets at that particular service provider.

In the case where a ticket 40 can have additional incremental value added, part of step 153 (FIG. 2) would include not only verifying that the ticket 40 is valid, but determining the total value of the ticket. Again, the ticket's value as seen by a user is not intended to be in monetary units, but incremental credits or ticket level. For example, a ticket 40 may be initialized with one credit at level 2 at time of sale (a base value), and be valid for time based uses at all service providers of level 2 services. Additional credits can be fractions of the base value. For example, additional increments might be one quarter of the initial value. A user can then purchase four additional increments to take a guest if that is a feature of the system, or might purchase only the number of incremental credits to be able to use the ticket 40 at a particular service provider who provides the corresponding level of services. In this embodiment of the invention, the service provider verifies the ticket's validity and its value (level) at time of redemption. Because the ticket 40 can be a one-time-use ticket, any additional value on the ticket 40 that exceeds that needed for the user to redeem for the service will be lost to the user.

Processing Environment

Figure 6:
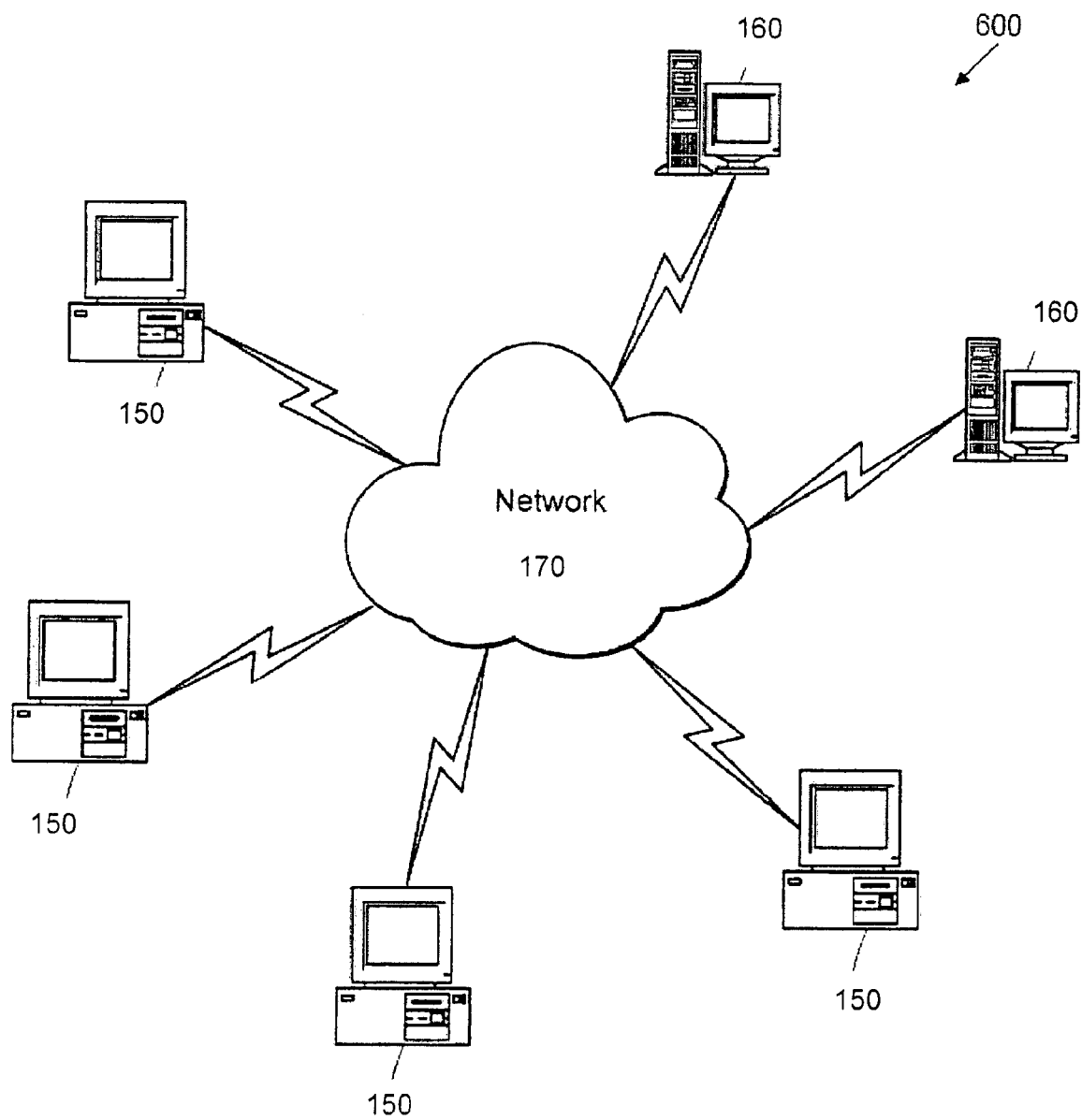
FIG. 6 is a schematic view illustrating a computer network or similar digital processing environment in which embodiments of the present invention may be implemented.

FIG. 6 illustrates a computer network or similar digital processing environment 600 in which the present invention may be implemented. Client computer(s)/devices 150 and server computer(s) 160 provide processing, storage, and input/output devices executing application programs and the like. Client computer(s)/devices 150 can also be linked through communications network 170 to other computing devices, including other client devices/processes 150 and server computer(s) 160. Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
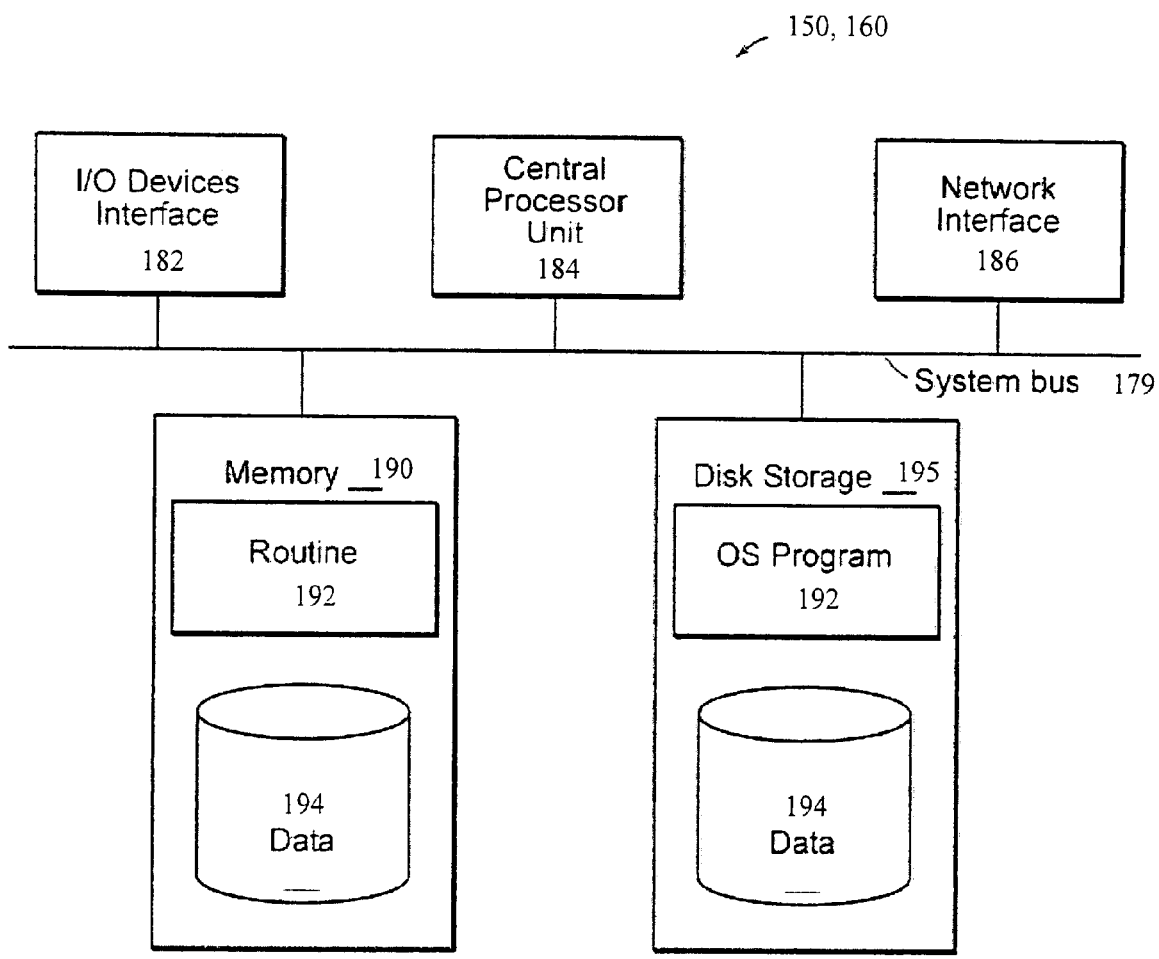
FIG. 7 is a block diagram illustrating the internal structure of a computer node or processor device of the network of FIG. 6.

FIG. 7 is a diagram of the internal structure of a computer (e.g., client processor/device 150 or server computers 160) in the computer system of FIG. 16. Each computer 150, 160 contains system bus 179, where a bus is a set of hardware lines used for data transfer among the components of a computer or processing system. Bus 179 is essentially a shared conduit that connects different elements of a computer system (e.g., processor, disk storage, memory, input/output ports, network ports, etc.) that enables the transfer of information between the elements. Attached to system bus 179 is an Input/Output (I/O) device interface 182 for connecting various input and output devices (e.g., keyboard, mouse, displays, printers, speakers, etc.) to the computer 150, 160. Network interface 186 allows the computer to connect to various other devices attached to a network (e.g., network 170 of FIG. 6). Memory 190 provides volatile storage for computer software instructions 192 and data 194 used to implement an embodiment of the present invention (e.g., services system 10, 300). Disk storage 195 provides non-volatile storage for computer software instructions 192 and data 194 used to implement an embodiment of the present invention. Central processor unit 184 is also attached to system bus 179 and provides for the execution of computer instructions.

In one embodiment, the processor routines 192 and data 194 are a computer program product, including a computer readable medium (e.g., a removable storage medium, such as one or more DVD-ROM's, CD-ROM's, diskettes, tapes, etc.) that provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network, such as the Internet, or other network(s)). Such carrier medium or signals provide at least a portion of the software instructions for the present invention routines/program 192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer networks illustrated in FIGS. 1, 2, 6 and 7 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

It should be noted that the headings used above are meant as a guide to the reader and should not be considered limiting in any way.

What is claimed is:

1. A computer implemented method of providing a provision of access to services, comprising the computer implemented steps of:
   (a) providing a ticket that enables use of services offered by one or more service providers during prespecified use periods by:
      defining a first use period enabling a ticket holder to use the ticket during the first use period in exchange for admission to services offered by one or more of the service providers including authorizing a right to use the ticket in exchange for admission to one of the services at least once during the first use period;
      causing the first use period to expire at the end of the first use period, where a ticket provider who issues the ticket receives value for the ticket holder's failure to use the ticket within the first use period, while the service providers do not receive value for the ticket holder's failure to use the ticket within the first use period; and
      defining a second use period enabling the ticket holder to use the ticket during the second use period in exchange for admission to services offered by one or more of the service providers, where the second use period is different from the first use period; and
   (b) enabling at least one of the service providers to process the ticket using a communications network including:
      upon remittance by a ticket holder during a use period, admitting the ticket holder to a user-selected service during the use period; and redeeming a value set by the service provider for the user-selected service.

2. A computer implemented method as in claim 1 wherein the second use period is different from the first use period further includes setting the second use period so that the second use period commences on or after the expiration of the first use period.

3. A computer implemented method as in claim 1 wherein the step of providing a ticket that enables use of services offered by one or more service providers during pre-specified use periods further includes the step of defining a third use period enabling a ticket holder to use the ticket during the third use period in exchange for admission to services offered by one or more of the service providers, where the first, second and third use periods are different, and the third use period commences on or after the expiration of the second use period.

4. A computer implemented method as in claim 3 wherein the first, second and third periods have respective time intervals that are equivalent in length.

5. A computer implemented method as in claim 1 wherein causing the first use period to expire further includes preventing admission to one of the services using the ticket during a remainder of the first use period.

6. A computer implemented method as in claim 1 further including the step of responding to a selection, by the ticket holder, of services offered by one of the service providers by:
 using the communications network, processing the ticket to determine whether the ticket is valid; and
 using the communications network, redeeming the ticket if the ticket is valid.

7. A computer implemented method as in claim 6 wherein using the communications network, redeeming the ticket if the ticket is valid further includes the step of responding to the redeeming of the ticket by allowing the ticket holder access to the selected service.

8. A computer implemented method as in claim 6 wherein using the communications network, processing the ticket to determine whether the ticket is valid further includes the steps of:
 determining a desired use period based on a time period in which the ticket holder intends to use the ticket for admission to the selected service;
 comparing the ticket holder's desired use period with the pre-specified use periods; and
 if the ticket holder's desired use period is within one of the pre-specified use periods, determining that the ticket is valid.

9. A computer implemented method as in claim 8 wherein determining a desired use period further includes the step of enabling the ticket holder to make a reservation for use of the selected services for the desired use period.

10. A computer implemented method as in claim 9 wherein enabling the user to make a reservation for use of the selected service during the desired use period further includes accessing, by the ticket holder, an online reservation system to create the reservation.

11. A computer implemented method as in claim 8 wherein if the ticket holder's desired use period is not within one of the pre-specified use periods, allowing the ticket holder to upgrade the ticket:
 enabling optional purchase of additional incremental value above a base ticket value of the ticket; and
 presenting the ticket by the ticket holder to the one service provider in exchange for use of the selected services where the price debited by the one service provider being higher than the base ticket value.

12. A computer implemented method as in claim 6 wherein the communications network is one or more of the following: credit card network, debit card network, or private label network.

13. A computer implemented method as in claim 6 wherein the service providers are authorized merchants that are part of the communications network, each merchant having access to the communications network to process the ticket using an input/out port to a card processor of the communications network; and
 the step of using the communications network, processing the ticket further including excluding any reporting of monetary value associated with the ticket, while providing reporting of incremental credit information.

14. A computer implemented method as in claim 6 wherein redeeming the ticket if the ticket is valid further includes the steps of:
 redeeming the ticket at a variable rate; and
 in response to the redemption of the ticket, allowing the ticket holder access to the selected service.

15. A computer implemented method as in claim 14 wherein redeeming the ticket at a variable rate further includes the steps of:
 debiting a price set by the one service provider for the selected service, wherein the price debited for the service by a portion of the service providers is different from price debited by other service providers for the same service, such that the ticket is redeemed at a variable rate among the service providers for the same service; and
 effecting payment at the price debited for the selected service.

16. A computer implemented method as in claim 15 wherein any differences in prices debited by the service providers for substantially the same services are absorbed.

17. A computer implemented method as in claim 14 wherein redeeming the ticket at a variable rate further includes accepting the ticket for a single use of the selected service.

18. A computer implemented method as in claim 14 wherein redeeming the ticket at a variable rate further includes accepting the ticket for multiple uses of the selected service.

19. A computer implemented method as in claim 6 wherein the ticket is redeemable for the selected service from the one service provider, as opposed to a cash value.

20. A computer implemented method as in claim 6 wherein the ticket is redeemable for the selected service from the one service provider, as opposed to a cash value.

21. A computer implemented method as in claim 1 wherein the service providers provide similar services.

22. A computer implemented method as in claim 21 wherein the similar services are one of the following: golf services, spa services, or movie theatre services.

23. A computer implemented method as in claim 1 wherein the ticket is implemented using a card, using an electronic ticket, or using an access code.

24. A computer implemented method as in claim 1 wherein the ticket has a unique identifier, and upon purchase of the ticket, activating the ticket by a seller thereof, the step of activating including validation of the unique identifier of the ticket.

25. A computer implemented method as in claim 1 further including the steps of absorbing any differences in prices debited by the service providers for the same service, and optionally adjusting price of the ticket redeemable for the service.

26. A computer implemented method as in claim 1 wherein based on the defined use period, the ticket is valid for redemption for a limited period of time after activation and further comprising the additional step of the service provider verifying an expiration date of the defined use period of the ticket.

27. A computer implemented system for providing a provision of access to services comprising:
 a ticket having two or more use periods defining time intervals in which the ticket is useable as a provision of access to services offered by a set of service providers, the ticket including:
  a first use period enabling a ticket holder to use the ticket during the first use period in exchange for admission to services offered by one or more of the service providers, the first use period enabling a right to use the ticket in exchange for admission to one of the services at least once during the first use period;
  the first use period expiring at the end of the first use period, where a ticket provider who issues the ticket receives value for the ticket holder's failure to use the ticket within the first use period, while the service providers do not receive value for the ticket holder's failure to use the ticket within the first use period; and
  a second use period enabling the ticket holder to use the ticket during the second use period in exchange for admission to services offered by one or more of the service providers, where the second use period is different from the first use period; and
 a computer processor, in communication with a communications network, enabling at least one of the service providers to process the ticket upon remittance by a ticket holder during one of the use periods by redeeming the ticket in exchange for a value set by the service provider for the selected service.

28. A computer implemented system as in claim 27 wherein the service providers are authorized merchants having access to the communications network, the communications network including includes a credit card processing network to process the ticket using an input/out port to a card processor of the credit card processing network; and
 the credit card processing network processing the ticket excluding any reporting of monetary value associated with the ticket, while providing reporting of incremental credit information.

29. A computer implemented method of providing a provision of access to services, comprising the computer implemented steps of:
 (a) providing a ticket that enables use of services offered by one or more service providers during prespecified use periods by:
  defining a first use period enabling a ticket holder to use the ticket during the first use period in exchange for admission to services offered by one or more of the service providers;
  defining a second use period enabling the ticket holder to use the ticket during the second use period in exchange for admission to services offered by one or more of the service providers, where the second use period is different from the first use period; and
 (b) enabling at least one of the service providers to process the ticket upon remittance by a ticket holder during a use period by admitting the ticket holder to a user-selected service during said use period and by redeeming a value set by the service provider for the user-selected service including:
  responding to a selection, by the ticket holder, of services offered by one of the service providers by:
   using a computer processor, in communication with a communications network, processing the ticket to determine whether the ticket is valid including:
    determining a desired use period based on a time period in which the ticket holder intends to use the ticket for admission to the selected service;
    comparing the ticket holder's desired use period with the pre-specified use periods; and
    if the ticket holder's desired use period is within one of the pre-specified use periods, determining that the ticket is valid;
   using the computer processor, in communication with the communications network, redeeming the ticket if the ticket is valid; and
   if the ticket holder's desired use period is not within one of the pre-specified use periods, allowing the ticket holder to upgrade the ticket by:
    enabling optional purchase of additional incremental value above a base ticket value of the ticket; and
    presenting the ticket by the ticket holder to the one service provider in exchange for use of the selected services where a price debited by the one service provider being higher than a base ticket value.

30. A computer implemented method as in claim 29 wherein the service providers are authorized merchants having access to the communications network, the communications network including a credit card processing network to process the ticket using an input/out port to a card processor of the credit card processing network; and
 the step of using the credit card processing network to process the ticket further includes excluding any reporting of monetary value associated with the ticket, while providing reporting of incremental credit information.

31. A computer implemented system for providing a provision of access to services comprising:
 a ticket having two or more use periods defining time intervals in which the ticket is useable as a provision of access to services offered by a set of service providers; and
 a computer processor, in communication with a communications network, the computer processor processing a ticket at a variable rate if the ticket is valid, the computer processor processing the ticket to determine whether the ticket is valid by:
  determining a desired use period based on a time period in which the ticket holder intends to use the ticket for admission to a selected service;
  comparing the ticket holder's desired use period with the pre-specified use periods; and
  if the ticket holder's desired use period is within one of the pre-specified use periods, determining that the ticket is valid;
 the credit card network redeeming the ticket if the ticket is valid; and
 the computer processor, in communication with a communications network, allowing the ticket holder to upgrade the ticket if the ticket holder's desired use period is not within one of the pre-specified use periods by enabling optional purchase of additional incremental value above a base ticket value of the ticket, where a price debited is higher than a base value for use of the ticket.

32. A computer implemented system as in claim 31 wherein the service providers are authorized merchants having access to the communications network, the communications network including a credit card processing network to process the ticket using an input/out port to a card processor of the credit card processing network; and the credit card processing network processing the ticket excluding any reporting of monetary value associated with the ticket, while providing reporting of incremental credit information.

33. A computer implemented method of providing a provision of access to services, comprising the computer implemented steps of:
(a) providing a ticket that enables use of services offered by one or more service providers during prespecified use periods by:
defining a first use period enabling a ticket holder to use the ticket during the first use period in exchange for admission to services offered by one or more of the service providers;
defining a second use period enabling the ticket holder to use the ticket during the second use period in exchange for admission to services offered by one or more of the service providers, where the second use period is different from the first use period; and
(b) enabling at least one of the service providers to process the ticket upon remittance by a ticket holder during a use period by admitting the ticket holder to a user-selected service at that time and by redeeming a value set by the service provider for the selected service including:
responding to a selection, by the ticket holder, of services offered by one of the service providers by:
using a communications network, processing the ticket to determine whether the ticket is valid;
using the communications network, redeeming the ticket if the ticket is valid;
where the service providers are authorized merchants that are part of the communications network, each merchant having access to the communications network to process the ticket using an input/out port to a card processor of the communications network; and
the step of using the communications network, processing the ticket further including excluding any reporting of monetary value associated with the ticket, while providing reporting incremental credit information.

34. A computer implemented system for providing a provision of access to services comprising:
a ticket having two or more use periods defining time intervals in which the ticket is useable as a provision of access to services offered by a set of service providers; and
a computer processor, in communication with a communications network, the computer processor processing the ticket at a variable rate if the ticket is valid, the computer processor processing the ticket to determine whether the ticket is valid by:
using the communications network, redeeming the ticket if the ticket is valid;
where the service providers are authorized merchants that are part of the credit card network, each merchant having access to the credit card network to process the ticket using an input/out port to a card processor of the credit card network; and
the computer processor processing the ticket excluding any reporting of monetary value associated with the ticket, while providing reporting of incremental credit information.

35. A computer implemented method of providing a provision of access to services, comprising the computer implemented steps of:
(a) providing a ticket that enables use of services offered by one or more service providers during prespecified use periods by:
defining a first use period enabling a ticket holder to use the ticket during the first use period in exchange for admission to services offered by one or more of the service providers;
defining a second use period enabling the ticket holder to use the ticket during the second use period in exchange for admission to services offered by one or more of the service providers, where the second use period is different from the first use period; and
(b) enabling at least one of the service providers to process the ticket upon remittance by a ticket holder during a use period by admitting the ticket holder to a user-selected service at that time and by redeeming a value set by the service provider for the selected service including:
responding to a selection, by the ticket holder, of services offered by one of the service providers by:
using a communications network, processing the ticket to determine whether the ticket is valid;
using the communications network, redeeming the ticket if the ticket is valid by:
redeeming the ticket at a variable rate by debiting a price set by the one service provider for the selected service, wherein the price debited for the service by a portion of the service providers is different from a price debited by other service providers for the same service, such that the ticket is redeemed at a variable rate among the service providers for the same service; and
effecting payment at the price debited for the selected service; and
in response to the redemption of the ticket, allowing the ticket holder access to the selected service.

36. A computer implemented method as in claim 35 wherein the service providers are authorized merchants having access to the communications network, the communications network including a credit card processing network to process the ticket using an input/out port to a card processor of the credit card processing network; and
the step of using the credit card processing network to process the ticket further includes excluding any reporting of monetary value associated with the ticket, while providing reporting of incremental credit information.

37. A computer implemented system for providing a provision of access to services comprising:
a ticket having two or more use periods defining time intervals in which the ticket is useable as a provision of access to services offered by a set of service providers;
a computer processor, in communication with a communications network, the computer processor processing a ticket at a variable rate if the ticket is valid, the computer process, in communication with a communication network, determining that the ticket is valid by:
redeeming the ticket at a variable rate by debiting a price set by the one service provider for the selected service, wherein the price debited for the service by a portion of the service providers is different from price debited by other service providers for the same service, such that the ticket is redeemed at a variable rate among the service providers for the same service; and
effecting payment at the price debited for the selected service; and
the redemption of the ticket enabling a ticket holder to have access to one of the services.

38. A computer implemented system as in claim 37 wherein the service providers are authorized merchants having access to the communications network, the communications network including a credit card processing network to process the ticket using an input/out port to a card processor of the credit card processing network; and the credit card processing network processing the ticket excluding any reporting of monetary value associated with the ticket, while providing reporting of incremental credit information.

* * * * *